(12) United States Patent
Wieczorek et al.

(10) Patent No.: US 7,409,207 B2
(45) Date of Patent: Aug. 5, 2008

(54) COMMUNICATION SYSTEM AND METHOD

(75) Inventors: Philippe Wieczorek, Saint Ismier (FR); Lionel Kyriakides, Brignoud (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 10/686,661

(22) Filed: Oct. 17, 2003

(65) Prior Publication Data
US 2004/0111405 A1    Jun. 10, 2004

(30) Foreign Application Priority Data
Oct. 18, 2002  (EP) .................................. 02354162

(51) Int. Cl.
*H04M 3/00* (2006.01)

(52) U.S. Cl. .................... 455/418; 455/412.1; 455/424; 455/461; 370/328

(58) Field of Classification Search ............. 455/412.1, 455/404.1, 414.1, 419, 424, 461, 426.2, 418; 370/328
See application file for complete search history.

(56) References Cited

U.S. PATENT DOCUMENTS

| | | | |
|---|---|---|---|
| 5,884,032 A | | 3/1999 | Bateman et al. |
| 6,101,387 A | * | 8/2000 | Granberg et al. ............ 455/433 |
| 6,104,924 A | * | 8/2000 | Shirai .......................... 455/418 |
| 6,208,877 B1 | * | 3/2001 | Henry, Jr. .................... 455/566 |
| 6,275,692 B1 | | 8/2001 | Skog |
| 6,400,940 B1 | * | 6/2002 | Sennett ..................... 455/414.1 |
| 6,769,915 B2 | * | 8/2004 | Murgia et al. ................ 434/236 |
| 6,959,187 B2 | * | 10/2005 | Grossi et al. ................. 455/423 |
| 2002/0032564 A1 | * | 3/2002 | Ehsani et al. ................ 704/235 |
| 2002/0072347 A1 | | 6/2002 | Dunko et al. |

FOREIGN PATENT DOCUMENTS

| | | |
|---|---|---|
| EP | 1 091 606 | 4/2001 |
| WO | WO 01/30056 | 4/2001 |

* cited by examiner

*Primary Examiner*—Nghi H Ly

(57) ABSTRACT

The present invention provides a communication system and method via which users can obtain assistance from an operator on the use of their equipment such as, for example, a mobile phone. The user contacts the operator, who, using data relating to the equipment, retrieved from a database, talks the user through the use of their equipment. As the user attempts to give effect to any operator instructions, feedback is provided to the operator on the progress made by the user in attempting to implement those instructions.

29 Claims, 4 Drawing Sheets

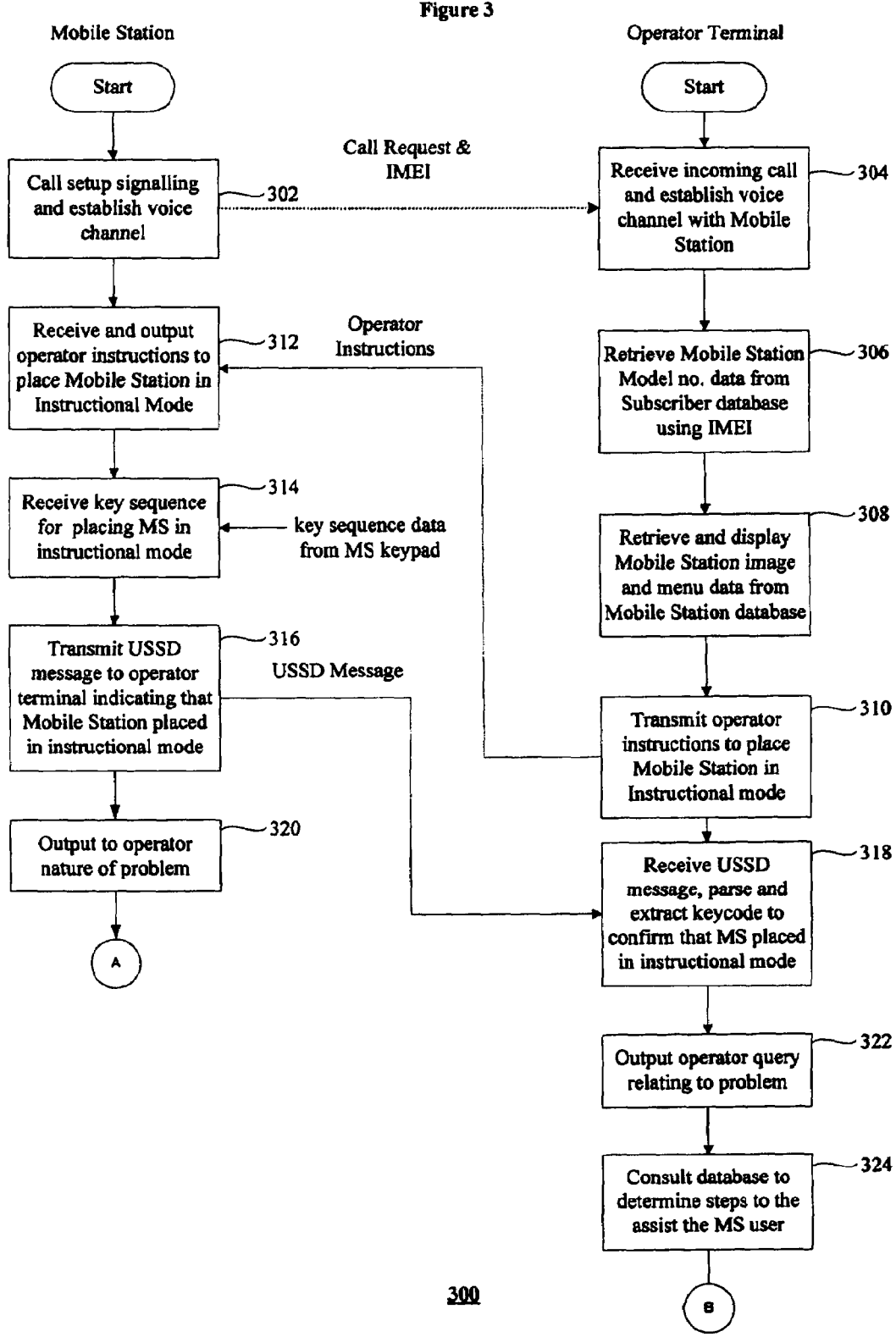

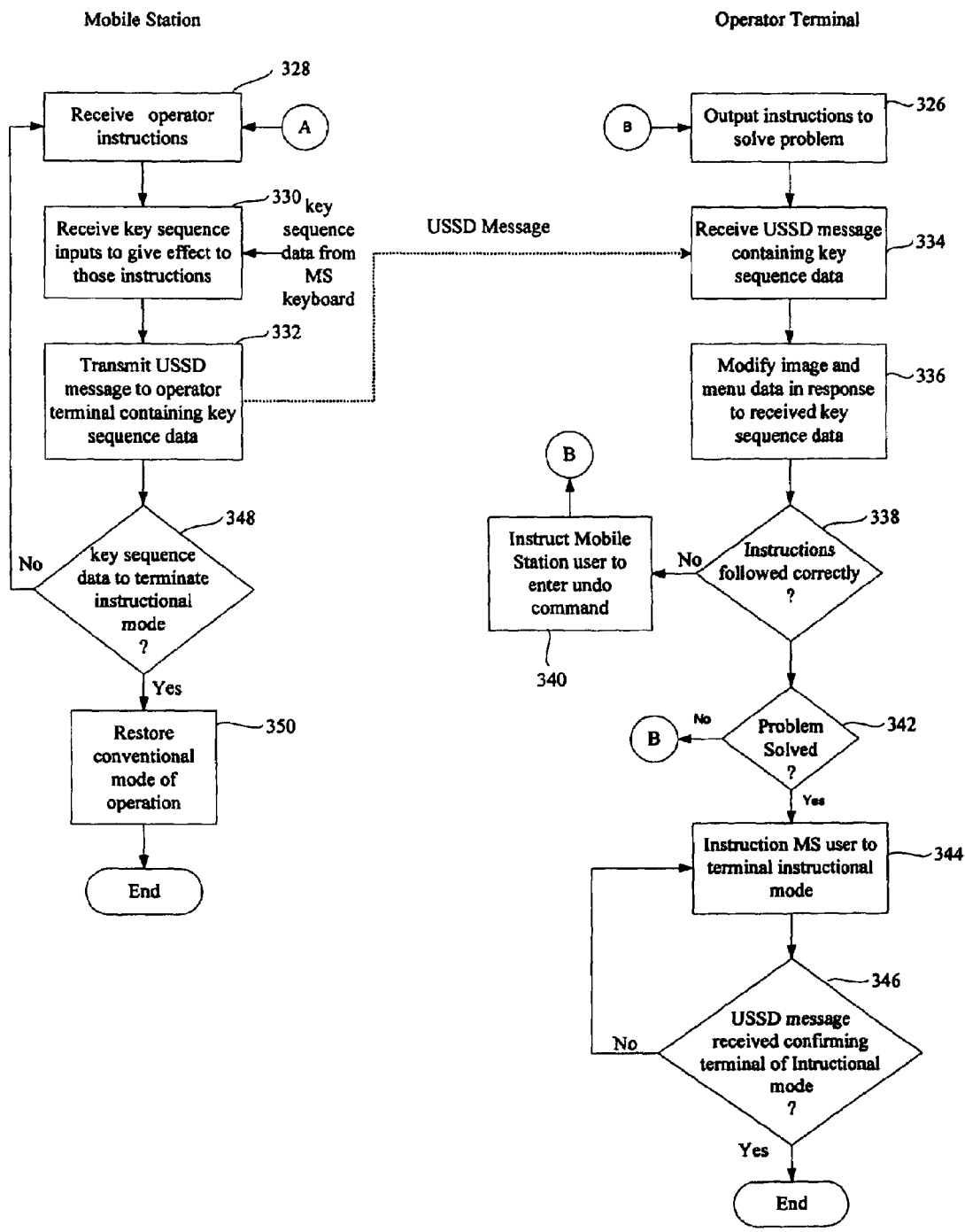

COMMUNICATION SYSTEM AND METHOD

FIELD OF THE INVENTION

The present invention relates to a communication system and method and, more particularly, to such a system and method for providing user assistance to an owner of a communication device such as, for example, a mobile telephone.

BACKGROUND TO THE INVENTION

It will be well appreciated by users of any new type of equipment that it can take some considerable time before they become proficient in using that equipment. The equipment will invariably provide significantly greater functionality to enhance the user's experience of using the equipment than is necessary to allow the equipment to be used in its most basic form or using its most basic functional features. For example, modern mobile telephones can be used for conventional person-to-person conversations using a voice channel. Mobile telephones also provide, for example, various functions such as electronic telephone books in which telephone numbers of friends, family and work colleagues can be stored. Not only can the telephone book store given telephone numbers, the names and, possibly, addresses of the persons to whom any given numbers correspond can also be stored. The alphanumeric characters representing the names and addresses are entered using the very limited number of dialling keys that are provided by mobile telephones. Accordingly, entering the details of any one person can be a relatively complex task. The mobile telephone will also have a number of menus that can be traversed using the various keys provided by the mobile telephone keypad. Each of these menus usually has a sub-menu from which the mobile telephone user can select various functions or operations to be performed.

Furthermore, with the advent of WAP phones, mobile telephone users have been able to access the Internet to locate and download information in a manner that is similar to the use of Internet Explorer in traversing the Internet from a computer. Again, there is a significant degree of functionality associated with the use of such WAP phones.

An instruction manual is usually provided with each of these devices. The instruction manual, while being comprehensive, is inconvenient in that the user cannot be expected to carry the instruction manual with them wherever they take their mobile telephone. Still further, having read the instruction manual, the user will invariably forget how to use various features of the mobile telephone. This applies in particular to features that are used irregularly.

Therefore, in the absence of the instruction manual, the user is left with relatively few options for obtaining assistance on how they may access the various features of their telephone.

It is an object of embodiments of the present invention to mitigate some of the problems of the prior art.

SUMMARY OF INVENTION

Accordingly, embodiments of the present invention provide a communication system comprising a communication device and a communication terminal; the communication terminal having access to a database to query data relating to the communication device; the data comprising invocation instructions for invoking at least one function of the communication device; the communication terminal comprising means to cause output, at the communication device, of data representing operator instructions, associated with the invocation instructions, comprising prescribed user input actions to be performed to invoke the at least one function of the communication device; and means to compare, or to enable comparison of, data representing actual user input actions, performed following output of the data representing the operator instructions, with the invocation instruction data to determine if the at least one function of the communication device has been invoked.

Advantageously, the user is able to obtain assistance or instruction upon the use of their mobile telephone even in the absence of the corresponding instruction manual or a significant degree of user familiarity with the mobile telephone.

Preferred embodiments provide a communication system in which the means to compare, or to enable comparison of, data representing the actual user input actions with data representing the invocation instructions comprises means to transmit a message comprising data representing the actual user input actions from the communication device to the communication terminal; and means to receive the message comprising the data representing the actual user input actions.

Suitably, feedback on the actions performed by the user of the communication device is provided to the operator of the terminal, which can be used to determine whether or not the user has performed the correct actions.

The menus and functions of a mobile telephone are usually invoked separately from supporting a voice channel. However, embodiments provide a communication system further comprising means to operate the communication device in at least one of first and second operational modes; the first operational mode being arranged to support voice and data exchanges with the communication terminal and the second operational mode being arranged to support at least user invocation of a user interface for managing the configuration of the communication device.

Preferably, embodiments allow the communication device to be operated in the two modes simultaneously.

Preferably, the communication device is a wireless communication device such as, for example, a mobile telephone, FPDA, WAP device or wireless computer.

Preferred embodiments provide a communication system in which the data relating to the communication device comprises image data and the communication terminal comprises a display to display an image of the communication device using the image data. This allows the operator of the communication terminal to visualise the communication device user's view and for the operator terminal user to provide instructions accordingly.

It will be appreciated that there are a significant number of functions that a communication device may support. Suitably, embodiments provide a communication system in which the data relating to the communication device comprises menu data representing menus and functions of the communication device that can be traversed and invoked; the at least one function being one of the functions; the communication terminal comprising means to display and manipulate the menus and functions.

When a user initially calls a support line, the state of the communication device, from the perspective of the support staff, will be unknown. Accordingly, embodiments provide a communication system further comprising means to synchronise the operational state of the communication device and the operational state of the image of the communication device.

Embodiments provide a communication system in which the communication terminal comprises means to transmit a message to the communication device; the message comprising data representing instructions to the communication device to assume a predetermined state. Therefore, the support personnel may take action to place the communication device in an appropriate state or mode of operation prior to giving instructions to the communication device user. Additionally, or alternatively, embodiments provide a communication system in which the communication device comprises means to transmit a message to the communication terminal; the message comprising data indicating that the communication device is in a prescribed operational state. The latter message may be generated in response to receipt of the former message from the communication terminal or in response to a pre-emptive user action.

Embodiments provide a method in which the step of placing comprises the step of entering a prescribed key sequence.

A further aspect of embodiments of the present invention provides a communication terminal comprising a communication manager to support incoming and outgoing voice channels; an interface for managing the exchange of data with at least a subscriber database, containing subscriber data identifying an associated communication device, and a communication device database, containing operational information relating to at least the communication device and associated invocation data for invoking at least one function of the device; and a user interface for at least displaying the operational information; means to output data representing user instructions associated with the operational information; a data service message manager to receive a data message bearing data representing user input signals generated in response to user invocation of an input means of the subscriber communication device in response to the user instructions; and means to compare, or to enable comparison of, the data representing the user input signals with the associated invocation data to determine whether the at least one function of the subscriber communication device has been invoked.

Preferably, there is provided a communication terminal in which the operational information comprises at least one of image data, representing at least one view of the communication device, and menu data representing menus and functions that can be traversed and invoked; the communication terminal comprising a display to display at least one of the image data and the menu data.

Preferred embodiments provide a communication terminal further comprising means to display the image data and the menu data in a predetermined state.

Preferably, embodiments provide a communication terminal further comprising means to synchronise the operational state of at least one of the image data and the menu data with the operational state of the communication device.

Embodiments provide a communication terminal further comprising means to transmit a message to the communication device comprising data representing an instruction to the communication device to assume a predetermined state.

Preferred embodiments provide a communication terminal further comprising means to receive a message from the communication device comprising data representing an instruction to the communication terminal that the communication device is in a prescribed state of operation.

Embodiments of a further aspect of the present invention provide a communication device comprising a user interface for influencing the operation of the communication device; means to perform at least one function in response to appropriate invocation of the user interface; means to output data representing user instructions, received from a communication terminal, for invoking the at least one function; means to generate a data message, for transmission to the communication terminal, comprising data representing user input actions effected using the user interface following output of the data representing the user instructions.

Preferably, embodiments provide a communication device further comprising means to operate the communication device in at least one of first and second operational modes; the first operational mode being arranged to support voice and data exchanges with a communication terminal and the second operational mode being arranged to support at least user invocation of a user interface for managing the operation, or configuration, of the communication device.

Preferred embodiments provide a communication device further comprising means to operate the communication device in both the first and second modes of operation substantially simultaneously.

Preferably, embodiments are provided in which the communication device is a wireless communication device. Preferably, the wireless communication device is a mobile telephone, WAP phone, PDA or computer.

Preferably, embodiments provide a communication device further comprising means to synchronise the operational state of the communication device with the operational state of image and menu data displayed on a display of the communication terminal.

Preferred embodiments provide a communication device further comprising means to receive a data message comprising data to instruct the communication device to assume a predetermined operational state.

Preferably, there is provided a communication device further comprising means to transmit a message comprising data indicating that the communication device has assumed a prescribed operational state.

Embodiments of a still further aspect of the present invention provide a computer program element for implementing a communication system, communication terminal or communication device as described or claimed in this specification.

Embodiments of a still further aspect of the present invention provide a computer program product comprising computer readable storage means storing such a computer program element.

BRIEF DESCRIPTION OF THE DRAWINGS

Embodiments of the present invention will now be described, by way of example only, with reference to the accompanying drawings in which:

FIG. 3 depicts a flowchart of an embodiment.

DETAILED DESCRIPTION OF DETAILED DESCRIPTION OF PREFERRED EMBODIMENTS

Figure 1:
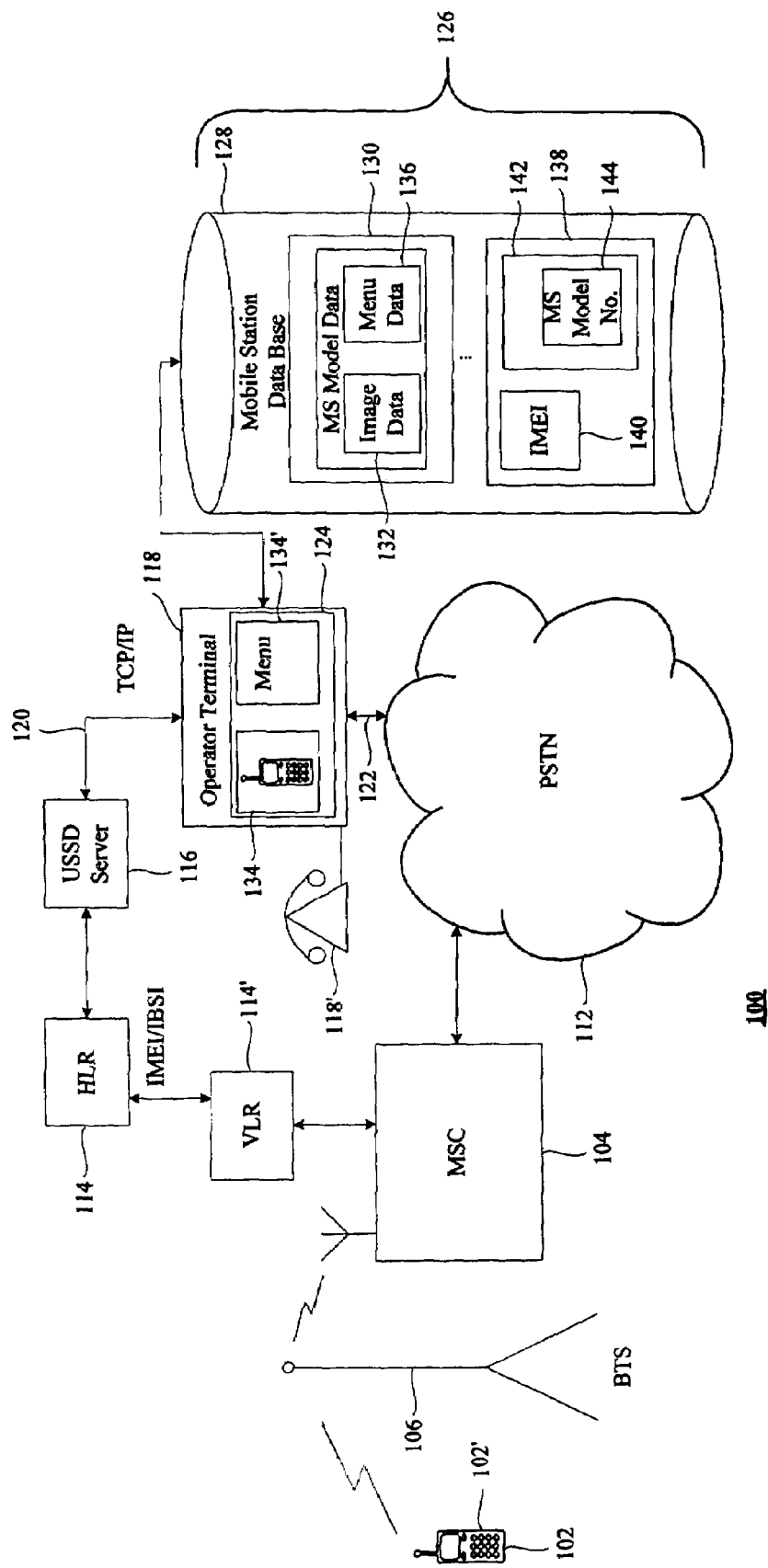
FIG. 1 shows a communication system according to an embodiment.

FIG. 1 shows a communication system 100 according to an embodiment. The communication system 100 comprises a mobile station 102 that can communicate with a mobile switching centre (MSC) 104 via a base transceiver station (BTS) 106. The mobile switching centre 104 is also connected to the public switched telephone network (PSTN) 112. The connection between the mobile switching centre 104 and the PSTN 112 allows the mobile station 102 to call fixed line telephone numbers in addition to other mobile stations.

The communication system 100 also has a home location register server 114 for storing home location register data. Optionally, the communication system 100 may have a visitor location register server 114' in case the mobile station 102 roams into an area other than its home location. The home location register server 114 is connected to a Unstructured Supplementary Service Data (USSD) server 116. The USSD server 116 is coupled to an operator terminal 118 via a suitable protocol connection 120. The suitable protocol connection 120 may be, for example, a TCP/IP connection. The operator terminal 118 is coupled to the PSTN 112 via a corresponding land-line 122.

The operator terminal 118 is arranged to execute a mobile station user assistance application 124, having a user interface (not shown), which can be used for providing user assistance to a mobile station subscriber. The application 124 can access a database 126 that is stored on an HDD 128. The database 126 contains data relating to a number of mobile stations. It will be appreciated for the sake of clarity that the database is illustrated as having data 130 relating to only a single mobile station.

The mobile station data 130 comprises image data 132, which is used to display various images 134 of the mobile station on the operator terminal 118. The mobile station data 130 also comprises menu data 136 that describes or defines the menu options available on the mobile station 102 to which the mobile station data 130 relates.

The mobile station has an International Mobile Equipment Identity number (IMEI) as defined in GSM 03.03. This identity number is used to identify the mobile station 102 to the elements of the system shown in FIG. 1. The mobile station 102 is also capable of sending and receiving unstructured supplementary service (USSD) data as defined in GSM 04.90 using a MAP service. USSD is a transport mechanism by which the mobile station 102 exchanges data with the network. USSD is session based and defined in GSM 02.90 and GSM 03.90.

In operation, if the user of the mobile station 102 requires assistance in relation to any feature of the mobile station 102, the user can dial the operator and request that assistance. Upon receiving an incoming call from the mobile station 102, the application 124 automatically extracts the International Mobile Equipment Identity number and searches a subscriber database 138 for a match with that number. The subscriber database 138 illustrated contains only a single International Mobile Equipment Identity number 140 and corresponding subscriber details 142. The subscriber details 142 include, in particular, mobile station model number data 144 that identifies the model or type of the mobile station 102 that originated the incoming call. Although the subscriber database 138 has been illustrated for the purposes of clarity as having a single entry, it will be appreciated, in practice, that the subscriber database 138 would contain a significantly greater number of entries. The mobile station model number data 144, returned from the subscriber database 138 to the application 124, is used to retrieve the corresponding mobile station model data 130 from the mobile station database 126. The retrieved mobile station data 130, as indicated above, are then displayed by the application 124 on a display (not shown) of the operator terminal 118.

The mobile station 102 is arranged so that it can be operated in two modes. The first mode is the conventional mode of operation in which the user can establish a voice or data channel and perform in or out of band signalling. The second mode is arranged so that the mobile station 102 can manage incoming and outgoing voice channels while concurrently allowing the various menus to be displayed and the various menu items or functions to be invoked, that is, the user can manage and configure the operation of the mobile telephone using the menus and functions as a user interface. The second mode is known as the instructional mode of operation. The second mode is an extension of the first mode. The extensions resides in making the various menus and functions, that is, the non-voice and non-data communication features, available for traversal and invocation concurrently with the conventional voice and data functionality of a mobile telephone.

Having established a voice channel with the operator terminal 118, the user of the mobile station 102 transmits a unique code to the operator terminal 118 using a USSD message (not shown). The USSD message is passed down the GSM hierarchy until it is eventually routed, via the USSD server 116, to the operator terminal. The application 124 receives and interprets the USSD message and sends an appropriate acknowledgement or reply USSD message (not shown) to the mobile station 102. The first USSD message transmitted by the mobile station 102 contains a text string arranged to provide an indication to the application 124 that the mobile station 102 has been placed in the instructional mode and has assumed a known initial condition. The known initial condition may be, for example, the state in which the mobile station 102 is placed upon power up. This ensures that the state of the mobile station 102 and the state of the mobile station model data, displayed by the application 124 on the display of the operator terminal 118, can be synchronised.

Figure 2:
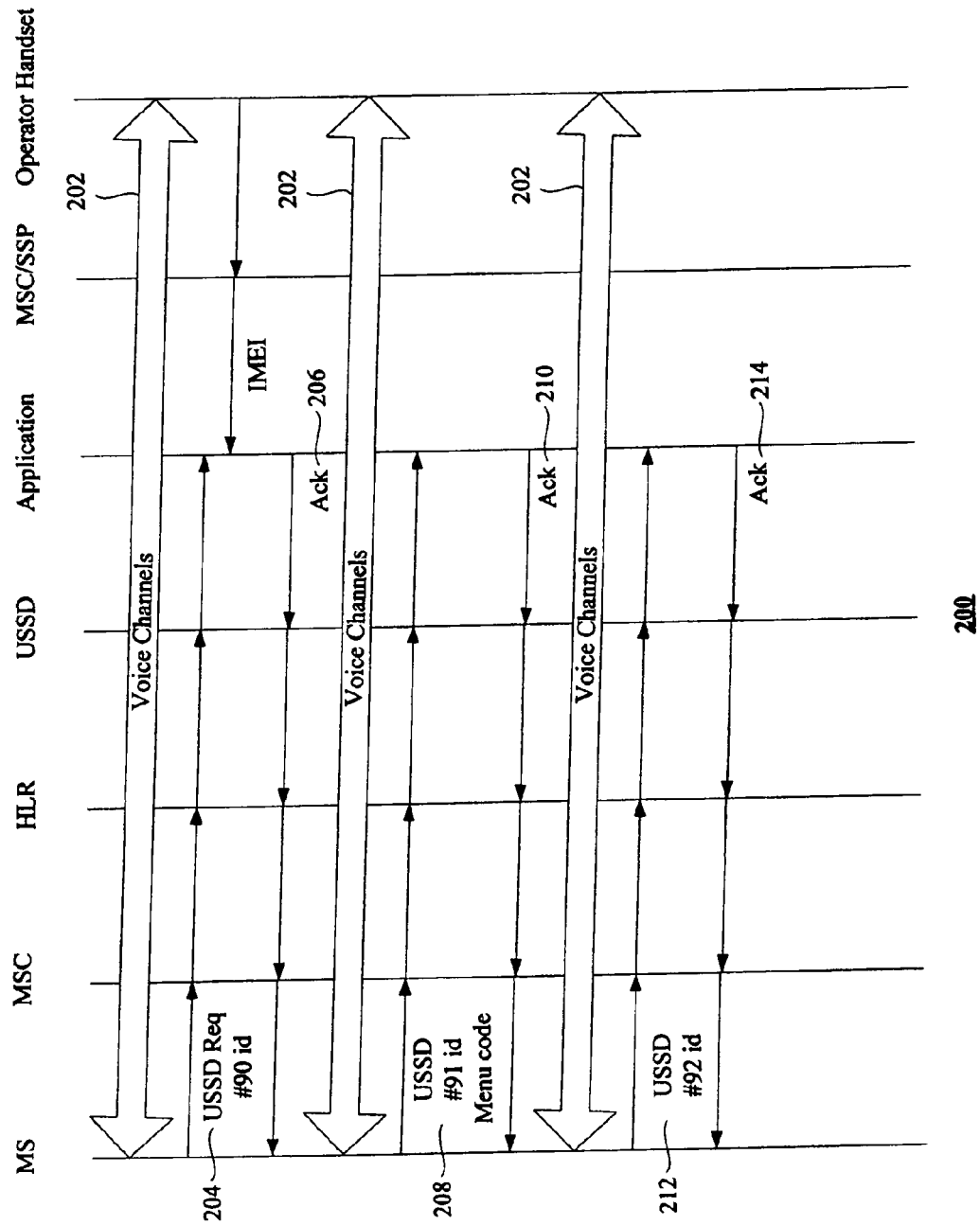
FIG. 2 illustrates a signalling diagram for the embodiment shown in FIG. 1.

Referring to FIG. 2, there is shown a signalling diagram 200 that illustrates the exchange of signals and USSD messages between the various elements of FIG. 1. When the user of the mobile station 102 initially contacts the operator for assistance, voice channels 202 are established between a handset 118' of the operator terminal 118 and the mobile station 102. Part of the signalling exchanged between the mobile station 102 and the operator handset 118' will include the IMEI. The IMEI is passed to the application 124 where the application 124 uses the IMEI to retrieve the appropriate mobile station model number data 144.

The operator instructs the user of the mobile station 102 to place the mobile station 102 in the second mode of operation mentioned above so that the mobile station 102 can both maintain the voice channels 202 and allow the user to traverse and invoke the various menus and functions of the mobile station 102.

The user responds to the instructions of the operator by entering a predetermined code into the mobile station 102 using the keypad 102'. For example, the user may enter "#90", which is sent in a USSD message 204 from the mobile station to the application.

On receiving the USSD message 204 containing the code "#90", the application 124 knows that the mobile phone has been initialised to a known state which allows the application 124 to synchronise the state of the image mobile station 134 and associated menus 134' to that of the physical mobile station 102. The application sends a first acknowledge USSD message 206 to the mobile station 102 via the USSD server 116, the HLR 114, the MSC 104 and the BTS 106.

The user of the mobile station 102 explains the nature of their problem to the operator of the operator terminal 118 via the voice channel 202. The operator provides instructions to the user on how their problem can be addressed having consulted the image 134 of the mobile station together with the menu data 136 displayed by the application 124 on the operator terminal 118. It will be appreciated that the verbal instructions of the operator will be represented as, or transmitted as, voice data output by the operator terminal or the telephone device 118' associated therewith or forming a part thereof. The user can attempt to give effect to the operator's instructions by pressing appropriate keys of the keypad 102'. Having pressed the appropriate keys, data representing the keystrokes is sent in a second USSD message 208 to the application 124. The second USSD message 208 contains a first identifier, which may be, for example, #91, that identifies the message as containing key sequence information, a second identifier, which is the IMEI in preferred embodiments, to identify to the mobile station 102 to the application 124 and data representing the key sequence. The application 124 transmits a second acknowledge signal 210 to the mobile station 102 in response to receipt of the second USSD message 208. The application 124 also parses the second USSD message 208 and gives effect to the key stroke information contained within that message by changing the image 134 of the mobile station 102 and the displayed menu information 134' so that the displayed information 134 and 134' is synchronised with the mobile station 102, that is, synchronised with the view of the mobile station 102 received by the user. The effect of modelling the key sequence at the operator terminal is noted by the operator. The operator determines from the noted effect whether the correct key sequence was input. Alternatively, or additionally, embodiments are arranged such that the operator generates a key sequence for solving a given problem or step of that problem. Therefore, the received key sequence and the generated key sequence can be compared by the operator or the application 124 to see if the operator instructions have been followed.

The exchange of USSD messages and acknowledgements, together with appropriate voice exchanges between the user of the mobile station 102 and the user of the operator terminal 118, continues until the mobile station user has completed the task or received the assistance required.

Having received the required assistance, the operator instructs the user of the mobile station 102 to change the mode of operation of the mobile station 102 from the instructional mode to the conventional mode. The user gives effect to this instruction by entering a prescribed code via the keypad 102'. In response to that prescribed code having been entered a further USSD message 212 is transmitted by the mobile station 102 to the application 124 to indicate that the mobile station 102 has been placed in the conventional mode of operation. Again, the application 124 transmits an acknowledge signal 214 to the mobile station to confirm receipt of the further USSD message 212.

Referring to FIG. 3, there is shown a pair of flowcharts 300 that illustrate the operations performed by the mobile station 102 and the operator terminal 118. The user (not shown) of the mobile station 102, at step 302, instigates establishment of a voice channel. The operator terminal 118, at step 304, receives the incoming call request and establishes the voice channel 202. The operator terminal 118, at step 304, also transmits the IMEI of the mobile station 102 to the application 124. The application 124 uses IMEI to retrieve the mobile station model number data 144 from the subscriber database 138, at step 306, and displays, at step 308, the image 134 and menu information 134' of the mobile station 102, having retrieved the mobile station data 130 from the mobile station database. At step 310, the operator, via the voice channel, instructs the user to put the mobile station in instructional mode. The operator's instructions are output to the user at step 312. The user, following the operator's instructions, dials an appropriate sequence of keys to place the mobile station 102 in instructional mode, which are noted by the mobile station at step 314. A USSD message containing an indication that the mobile station 102 has been placed in instructional mode is transmitted to the application 124 at step 316. In preferred embodiments, the indication comprises the key sequence entered by the user at step 314.

The USSD message is received and parsed at step 318 where the key sequence is extracted and analysed to confirm that the mobile station has been placed in instructional mode. The user and operator, at steps 320 and 322, discuss the assistance required. At step 324, the operator consults the database 130, image data 134 and menu 134' to determine the appropriate steps for assisting the user of the mobile station 102.

At step 326, the operator outputs their instructions for solving the problem via the voice channel 202. Those instructions are received by the mobile station and output to the user at step 328.

At step 330, the mobile station 102 notes a second key sequence that is intended to give effect to the instructions received from the operator.

At step 332, a USSD message is transmitted from the mobile station 102 to the operator terminal that contains an identifier, such as, for example, #91, which identifies the USSD message as containing key stroke data, together with the actual key stroke data. The USSD message is received, at step 334, by the operator terminal. Effect is given to the key sequence data at the operator terminal, which causes the image 134 and the menu data 134' to change according to that data at step 336.

It is determined, at step 338, given the newly modified image 134 and menu data 134', whether or not the instructions of the operator were followed correctly. If the determination is that the instructions were not followed correctly, the operator, at step 340, instructs the user of the mobile terminal to execute an undo command. This instruction is received at step 328 where processing continues as indicated.

However, if the determination, at step 338, was that the instructions were followed correctly, a determination is made at step 342 as to whether or not the user's problem has been solved. If the determination at step 342 is negative, processing is transferred to step 326 and continues as normal from that step. However, if the determination is positive, the operator issues a message to the mobile terminal that instructs the user to terminate the instructional mode at step 344. The operator terminal then awaits, at step 346, receipt of a USSD message from the mobile station 102 that confirms termination of the instructional mode.

Returning to the operation of the mobile station 102, following step 332, a determination is made, at step 348, as to whether or not the most recently entered key sequence represents a command to terminate the instructional mode. If the key sequence does not represent a command to terminate the instructional mode, control is transferred to step 328. However, if the key sequence is a command to terminate the instructional mode, the mobile station 102 is returned to its conventional mode of operation at step 350.

Although the above embodiments have been described in the context of a GSM mobile communication system, embodiments of the present invention are not limited to GSM. Embodiments can be realised that use some other mobile telephone standard such as, for example, CDMA 2000 or UMTS.

The above embodiments have been described with reference to the user manually switching the mobile station between conventional and instructional modes. However, embodiments provide a mobile communication system in which the USSD messages transmitted by the application 124 contains data representing commands to be performed by the mobile station 102. For example, rather than the user switching between conventional and instructional modes manually, the application 124 may transmit a USSD message that contains a command to place the mobile station in a prescribed mode, that is, the switch between modes is performed automatically.

Although the above embodiments have been described with reference to the MSC 104 being connected to the PSTN 112, embodiments are not limited to such an arrangement. Embodiments can be realised in which the connection to the operator terminal is wireless. In such embodiments, the PSTN would not form part of the network. Instead, calls to the operator (not shown) of the operator terminal 118 would be established using a wireless connection, that is, via a corresponding chain of Mobile Switching Centre, BSC, BTS and a wireless handset.

Furthermore, although the above embodiments have been described with reference to the USSD messages containing a number of key presses or a key sequence of key strokes, embodiments can be realised in which each USSD message contains data representing only a single key press, that is, the key sequence comprises data for a single user input action.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A communication system comprising a communication device and a communication terminal; the communication terminal having access to a database to query data relating the communication device; the data comprising invocation instructions for invoking at least one function of the communication device; the communication terminal comprising means to cause output, at the communication device, of data representing operator instructions, associated with the invocation instructions, comprising prescribed user input actions to be performed to invoke the at least one function of the communication device; and means to compare, or to enable comparison of, data representing actual user input actions, performed following output of the data representing the operator instructions, with the invocation instruction data to determine if the at least one function of the communication device has been invoked.

2. A communication system as claimed in claim 1, in which the means to compare, or to enable comparison of, data representing actual user input actions with data representing the invocation instructions comprises means to transmit a message comprising data representing the actual user input actions from the communication device to the communication terminal; means to receive the message comprising the data representing the actual user input actions.

3. A communication system as claimed in claim 1, further comprising means to operate the communication device in at least one of first and second operational modes; the first operational mode being arranged to support voice and data exchanges with the communication terminal and the second operational mode being arranged to support user invocation of a user interface for managing or configuring the operation of the communication device.

4. A communication system as claimed in claim 3, further comprising means to operate the communication device in both the first and second modes of operation substantially simultaneously.

5. A communication system as claimed in claim 1, in which the communication device is a wireless communication device.

6. A communication system as claimed in claim 5, in which the wireless communication device is a mobile telephone.

7. A communication system as claimed in claim 1, in which the data relating to the communication device comprises image data and the communication terminal comprises a display to display an image of the communication device using the image data.

8. A communication system as claimed in claim 1, in which the data relating to the communication device comprises menu data representing menus and functions of the communication device that can be traversed and invoked; the at least one function being one of the functions; the communication terminal comprising means to display and manipulate the menus and functions.

9. A communication system as claimed in claim 7, further comprising means to synchronise the operational state of the communication device and the operational state of the image of the communication device.

10. A communication system as claimed in claim 1, in which the communication terminal comprises means to transmit a message to the communication device; the message comprising data representing instructions to the communication device to assume a predetermined state.

11. A communication system as claimed in claim 1, in which the communication device comprises means to transmit a message to the communication terminal; the message comprising data indicating that the communication device is in a prescribed operational state.

12. A method of communication between a communication device and a communication terminal, the communication device comprising a communication operational mode to support voice and data communication with the communication terminal and an instructional operational mode to support user invocation of at least a user interface for configuring the communication device; the communication terminal comprising a database interface to provide access to a communication device database comprising data relating the operation of the communication device; the method comprising the steps of:

contacting, using the communication device, a user of the communication terminal to obtain assistance relating to the communication device;

identifying the communication device and retrieving the data relating to the communication device from the database;

placing the communication device in the instructional operational mode;

receiving, at the communication device, instructions from the user of the communication terminal relating to the operation of the communication device;

receiving user input actions in response to receipt of the instructions and transmitting data representing those input actions to the communication terminal using the data communication;

receiving, at the communication terminal, the data representing the user input actions and comparing the user input actions with the data relating to the communication device retrieved from the database to determine whether the user input actions correspond to the instructions;

determining that data representing the user input actions corresponds to data relating to the communication device; and terminating the communication between the communication device and the communication terminal.

13. A method as claimed in claim 12, in which the step of placing comprises the step of entering a prescribed key sequence.

14. A communication terminal comprising a communication manager to support incoming and outgoing voice channels; an interface for managing the exchange of data with at least a subscriber database, containing subscriber data identifying an associated subscriber communication device, and a communication device database, containing operational information relating to at least the subscriber communication device and associated invocation data for invoking at least one function of the device; and a user interface for at least displaying the operational information; means to output data representing user instructions associated with the operational information; a data service message manager to receive a data message bearing data representing user input signals generated in response to user invocation of an input means of the subscriber communication device in response to the user instructions; and means to compare, or to enable comparison of, the data representing the user input signals with the associated invocation data to determine whether the at least one function of the subscriber communication device has been invoked.

15. A communication terminal as claimed in claim 14, in which the operational information comprises at least one of image data, representing at least one view of the communication device, and menu data representing menus and functions that can be traversed and invoked; the communication terminal comprising a display to display at least one of the image data and the menu data.

16. A communication terminal as claimed in claim 14, further comprising means to display the image data and the menu data in a predetermined state.

17. A communication terminal as claimed in claim 14, further comprising means to synchronise the operational state of at least one of the image data and the menu data with the operational state of the communication device.

18. A communication terminal as claimed in claim 14, further comprising means to transmit a message to the communication device comprising data representing an instruction to the communication device to assume a predetermined state.

19. A communication terminal as claimed in claim 14, further comprising means to receive a message from the communication device comprising data representing an instruction to the communication terminal that the communication device is in a prescribed state of operation.

20. A communication device comprising a user interface for influencing the operation of the communication device; means to perform at least one function in response to appropriate invocation of the user interface; means to output data representing user instructions, received from a communication terminal, for invoking the at least one function; means to generate a data message, for transmission to the communication terminal, comprising data representing user input actions effected using the user interface following output of the data representing the user instructions, wherein the communication device is configured to receive feedback on user input actions to determine whether or not the user has performed the correct actions.

21. A communication device as claimed in claim 20, further comprising means to operate the communication device in at least one of first and second operational modes; the first operational mode being arranged to support voice and data exchanges with a communication terminal and the second operational mode being arranged to support at least user invocation of a user interface for managing the operation, or configuration, of the communication device.

22. A communication device as claimed in claim 21, further comprising means to operate the communication device in both the first and second modes of operation substantially simultaneously.

23. A communication device as claimed in claim 22, in which the communication device is a wireless communication device.

24. A communication device as claimed in claim 23, in which the wireless communication device is a mobile telephone.

25. A communication device as claimed in claim 20, further comprising means to synchronise the operation state of the communication device with the operational state of image and menu data displayed on a display of the communication terminal.

26. A communication device as claimed in claim 20, further comprising means to receive a data message comprising data instructing the communication device to assume a predetermined operational state.

27. A communication device as claimed in claim 20, further comprising means to transmit a message comprising data indicating that the communication device has assumed a prescribed operational state.

28. A computer program element for implementing a communication system, communication terminal or communication device as claimed in claim 20.

29. A computer program product comprising computer readable storage means storing a computer program element as claimed in claim 28.

* * * * *